(12) United States Patent
Inoda

(10) Patent No.: US 10,338,862 B2
(45) Date of Patent: Jul. 2, 2019

(54) INFORMATION PROCESSING DEVICE, NON-TRANSITORY RECORDING MEDIUM STORING COMPUTER READABLE PROGRAM, AND PRINTING SYSTEM

(71) Applicant: KONICA MINOLTA, INC., Chiyoda-ku, Tokyo (JP)

(72) Inventor: Ryosuke Inoda, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/886,062

(22) Filed: Feb. 1, 2018

(65) Prior Publication Data

US 2018/0260171 A1 Sep. 13, 2018

(30) Foreign Application Priority Data

Mar. 13, 2017 (JP) .................................. 2017-046963

(51) Int. Cl.
*G06F 3/12* (2006.01)
*G06K 15/00* (2006.01)
(Continued)

(52) U.S. Cl.
CPC ............ *G06F 3/1211* (2013.01); *B32B 37/10* (2013.01); *B32B 38/145* (2013.01); *G06F 3/1219* (2013.01); *G06F 3/1241* (2013.01); *G06F 3/1262* (2013.01); *G06F 3/1282* (2013.01); *G06F 3/1285* (2013.01); *G06K 15/1842* (2013.01); *G06K 15/1856* (2013.01); *G06K 15/1868* (2013.01); *G06K 15/404* (2013.01);
(Continued)

(58) Field of Classification Search
CPC .. G06F 3/1211; G06F 3/1219; G06F 2/11241; G06F 3/1262; G06F 3/1264; G06F 3/1282; G06F 3/1285; B32B 37/10; B32B 38/145; B32B 2038/042; B32B 2451/00; G06K 15/1842; G06K 15/1856; G06K 15/1868; G06K 15/404; G06K 15/4065; G06K 2215/0054; G06K 2215/0071
See application file for complete search history.

(56) References Cited

U.S. PATENT DOCUMENTS

2007/0201045 A1* 8/2007 Morales ................ G06F 3/1219
358/1.1
2012/0154866 A1* 6/2012 Chatow ................ G06F 3/1211
358/1.15

(Continued)

FOREIGN PATENT DOCUMENTS

JP 2012252523 A 12/2012

*Primary Examiner* — George R Koch
(74) *Attorney, Agent, or Firm* — Holtz, Holtz & Volek PC

(57) ABSTRACT

An object of the invention is to solve low productivity of foil-stamping printing due to frequent replacement of foil rolls when the positions of sizes of foil objects are different in a plurality of jobs. A grouping unit groups jobs on the basis of a foil roll which can be attached to a foil stamping device and foil object information. A job sorting unit sorts the grouped jobs on the basis of a sorting policy by group. A foil-stamping print data transmitting unit transmits foil-stamping print data including the foil object, which is extracted from print data to a foil stamping device. A foil roll replacement information output unit outputs foil roll replacement information indicating a timing that a foil roll is replaced.

27 Claims, 10 Drawing Sheets

(51) Int. Cl.
*B32B 37/10* (2006.01)
*B32B 38/00* (2006.01)
*G06K 15/02* (2006.01)
*B32B 38/04* (2006.01)

(52) U.S. Cl.
CPC .... *G06K 15/4065* (2013.01); *B32B 2038/042* (2013.01); *B32B 2451/00* (2013.01); *G06F 3/1264* (2013.01); *G06K 2215/0054* (2013.01); *G06K 2215/0071* (2013.01)

(56) References Cited

U.S. PATENT DOCUMENTS

| | | | | |
|---|---|---|---|---|
| 2013/0141763 A1* | 6/2013 | Giannetti | ............ | G06F 3/1219 |
| | | | | 358/1.18 |
| 2014/0153004 A1* | 6/2014 | Tufano | ................ | G06F 3/1205 |
| | | | | 358/1.2 |
| 2017/0257508 A1* | 9/2017 | Kawasaki | ............ | G03G 15/50 |

\* cited by examiner

| | FOIL ROLL WIDTH [mm] |
|---|---|
| FOIL ROLL A | 148 |
| FOIL ROLL B | 210 |
| FOIL ROLL C | 297 |

FIG. 7
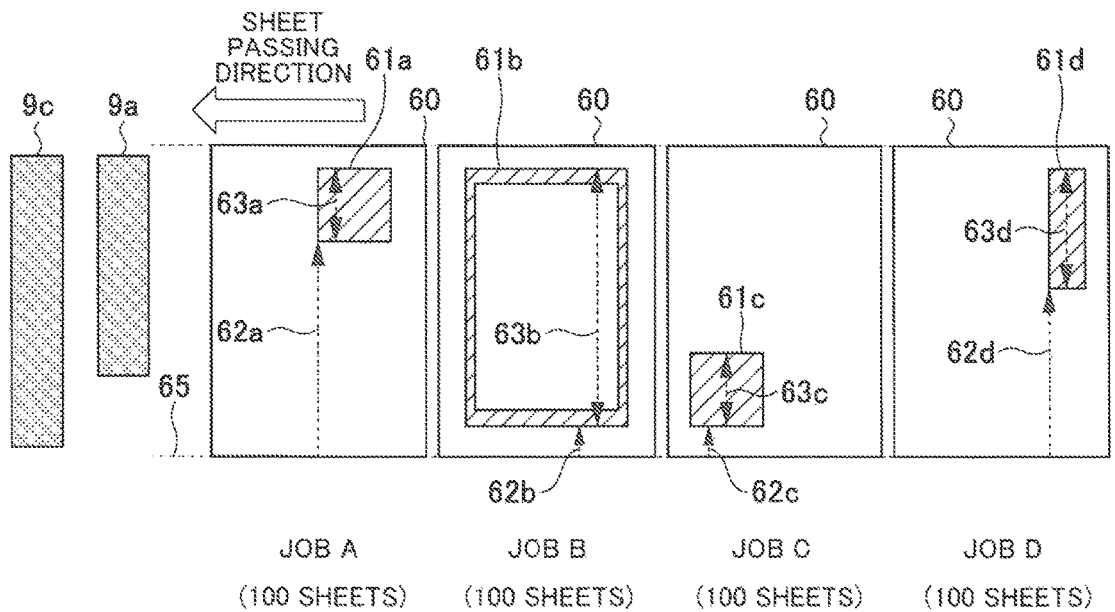
| | OFFSET[mm] | FOIL OBJECT WIDTH[mm] |
|---|---|---|
| JOB A | 240 | 50 |
| JOB B | 10 | 280 |
| JOB C | 10 | 50 |
| JOB D | 190 | 100 |
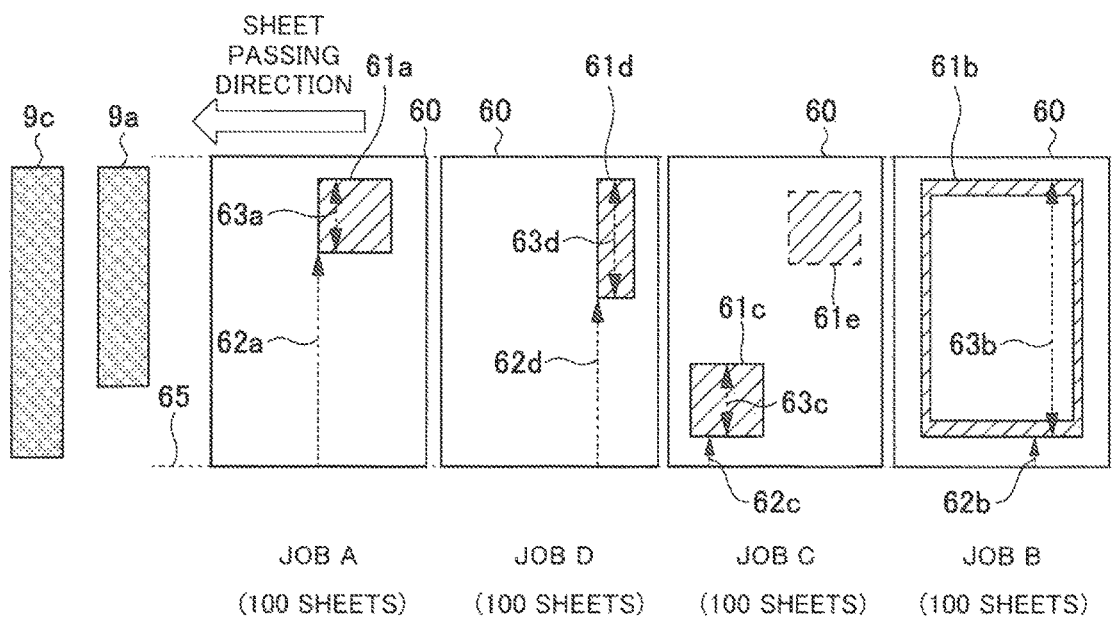

FIG. 8
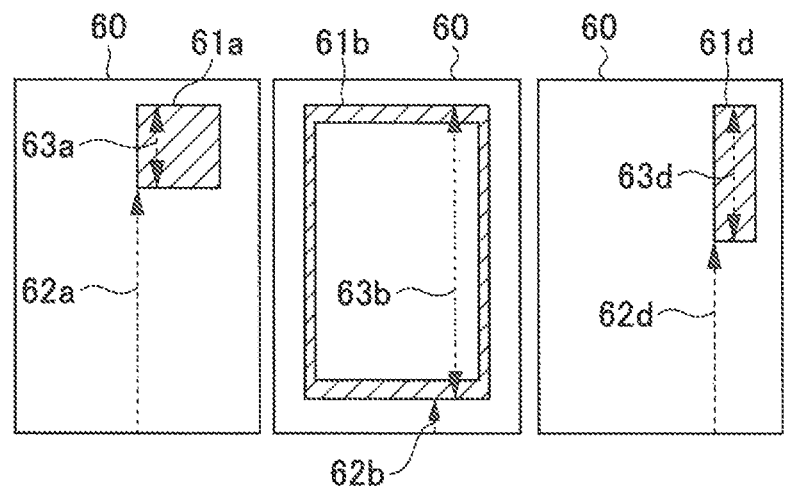
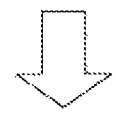
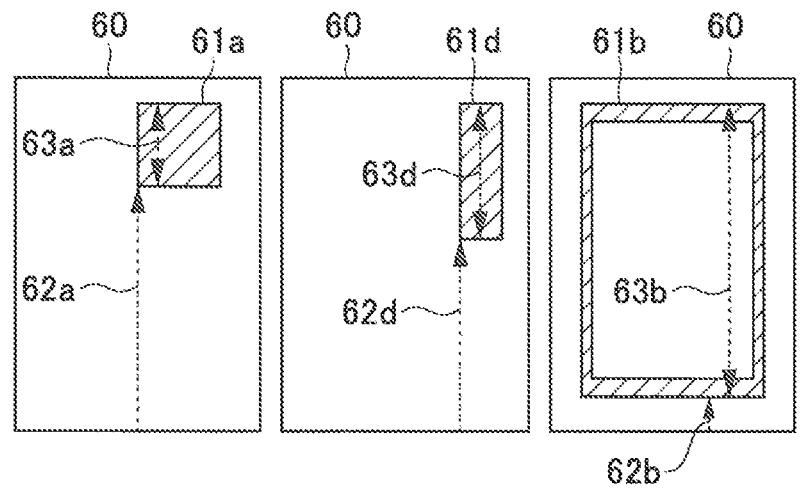

INFORMATION PROCESSING DEVICE, NON-TRANSITORY RECORDING MEDIUM STORING COMPUTER READABLE PROGRAM, AND PRINTING SYSTEM

CROSS-REFERENCE TO RELATED APPLICATIONS

The entire disclosure of Japanese Patent Application No. 2017-046963, filed on Mar. 13, 2017, is incorporated herein by reference in its entirety.

TECHNOLOGICAL FIELD

The present invention relates to an information processing device, a non-transitory recording medium storing a computer readable program, and a printing system.

BACKGROUND ART

A foil stamping device is a machine (device) performing foil stamping of making foil of gold, silver, or the like adhere to the surface of a printed sheet by pressure-bonding the foil to the sheet. Foil is rolled in a roll shape, and the foil stamping device pulls the foil rolled in a roll shape (so-called foil roll) interlockingly with carriage of a printed sheet and pressure-bonds it to the surface of the printed sheet. At this time of pressure bonding, work of applying varnish to a place where foil is to be stamped in the printed sheet, placing the foil to the entire sheet, and pressure-bonding the foil with heat is performed. As a result, the foil adheres to the place where the varnish is applied in the printed sheet, and a state where the foil is stamped is obtained.

In the foil-stamping printing, a foil roll having arbitrary foil roll width is set in the foil stamping device. A foil roll used even once for foil stamping is discarded. Consequently, by selecting a foil roll having suitable width in accordance with the position of an object to be subjected to foil stamping and replacing a foil roll every job, the foil roll discarding amount is suppressed.

Patent Literature 1 discloses a technique of decreasing the number of times of replacing sheets at the time of executing a job using a plurality of kinds of sheets by dividing the job and executing process.

CITATION LIST

Patent Literature

Patent Literature 1: Japanese Unexamined Patent Application Publication No. 2012-252523

SUMMARY

However, when a plurality of jobs are supplied, it takes efforts and time for a work of recognizing the position of foil stamping every job by an operator and replacing the foil roll to a foil roll having proper foil roll width every job. Even by using the technique disclosed in Patent Literature 1, an image cannot be divided or images cannot be sorted according to the position of a content in a print image and the sheet feeding direction, and the foil roll discarding amount cannot be suppressed.

The present invention has been made in consideration of such circumstances and an object of the invention is to improve the productivity of foil-stamping printing.

To achieve at least one of the above-mentioned objects, an information processing device in which an aspect of the present invention is reflected includes: a foil object information calculating unit calculating foil object information including position and size of a foil object in a direction orthogonal to a feeding direction of a sheet which is fed to a foil stamping device on the basis of foil-stamping print data extracted from print data included in a plurality of jobs; a grouping unit grouping the jobs on the basis of a foil roll which can be attached to the foil stamping device and the foil object information; a job sorting unit sorting the grouped jobs on the basis of a preliminarily specified sorting policy by group; a foil-stamping print data transmitting unit transmitting, to the foil stamping device, the foil-stamping print data including the foil object which is extracted from the print data and is for stamping foil to the sheet on which an image is formed; a no-foil print data transmitting unit transmitting no-foil print data which is extracted from the print data and does not include the foil object to an image forming device forming an image on a sheet; and a foil roll replacement information output unit outputting foil roll replacement information indicating a timing that the foil roll is replaced.

The information processing device is an embodiment of the present invention, and a non-transitory recording medium storing a computer readable program and a printing system in which an aspect of the present invention is reflected also have a configuration similar to the information processing device in which an aspect of the present invention is reflected.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 7 is an explanatory diagram illustrating a first example of sorting of jobs according to the embodiment of the invention.

FIG. 8 is an explanatory diagram illustrating a second example of sorting of jobs according to the embodiment of the invention.

DETAILED DESCRIPTION OF EMBODIMENTS

Figure 1:
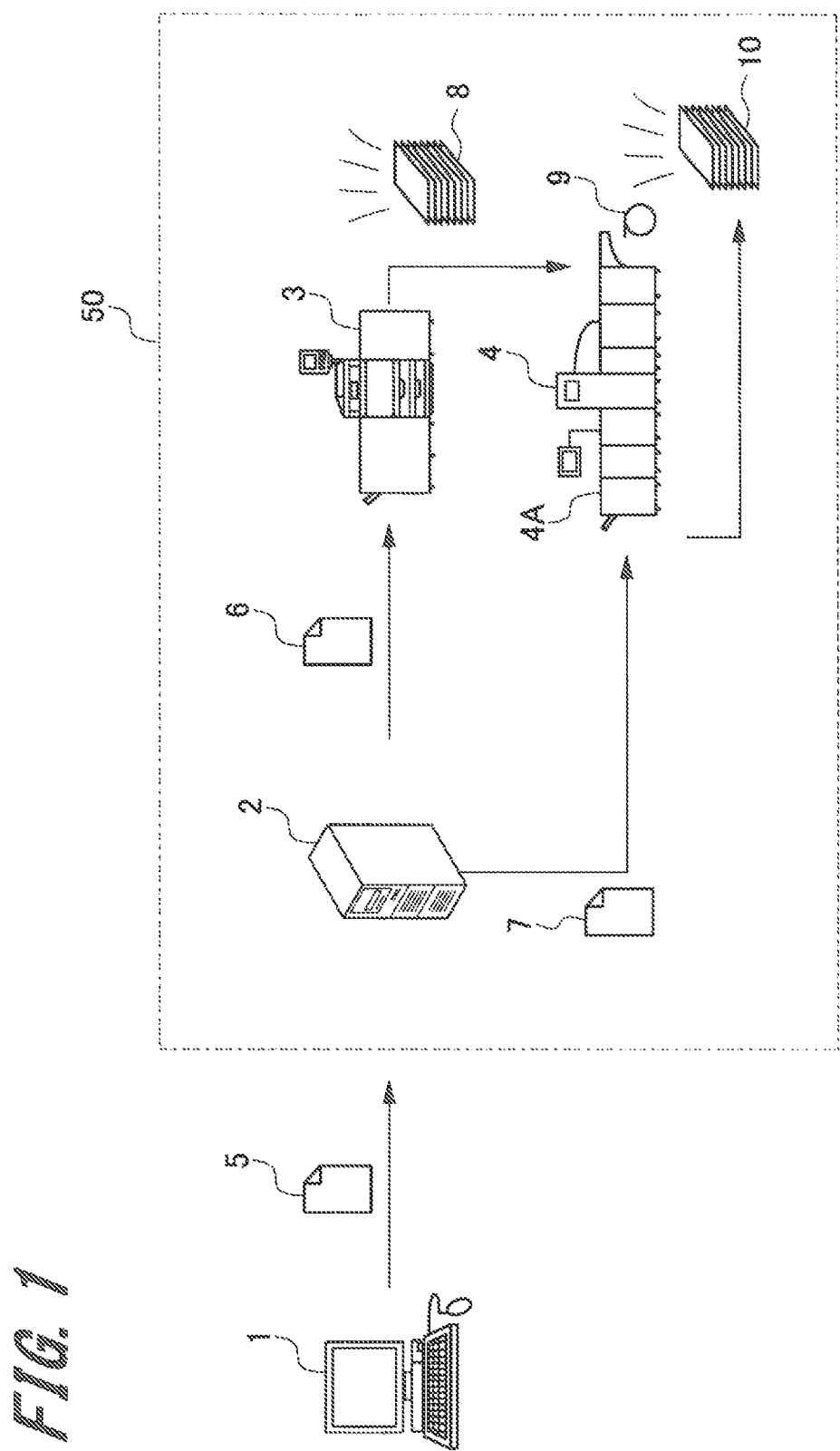
FIG. 1 is a schematic diagram illustrating a general configuration example of a printing system having a foil stamping device according to an embodiment of the present invention.

Hereinafter, embodiments of the present invention will be described with reference to the appended drawings. However, the scope of the invention is not limited to the disclosed embodiments. In the specification and the drawings, by designating the same reference numeral to components having substantially the same function or configuration, repetitive description will be omitted.

An Embodiment

FIG. 1 is a schematic diagram illustrating a general configuration example of a printing system 50 having a foil stamping device 4.

General Configuration of Printing System

The printing system 50 illustrated in FIG. 1 has a controller 2, an image forming device 3, and the foil stamping device 4. The controller 2, the image forming device 3, and the foil stamping device 4 are coupled to one another via a network N (refer to FIG. 2), and each of the devices is used as an example of an information processing device. To the foil stamping device 4, a post-process device 4A capable of sorting print matters 8 which are foil-stamping printed is coupled. The post-process device 4A can change the direction of the print matter 8 every job or page. In the foil stamping device 4, a foil roll 9 having arbitrary foil roll width is set.

To the controller 2, a job 5 input from a client terminal 1 is submitted. The job 5 includes, for example, print data for forming an image on a sheet by the image forming device 3. A job also includes printing setting information such as layout of an image on a sheet and the number of sheets on which the image is formed. The controller 2 generates no-foil print data 6 which does not include a foil object and foil-stamping print data 7 including a foil object and foil roll replacement information from the print data extracted from the job 5. The foil object is data specifying the position and shape of foil to be stamped on the print matter 8 by the foil stamping device 4, and is used for stamping foil to the print matter 8 (sheet) in which an image is formed.

The no-foil print data 6 is, for example, CMYK data (an example of color data) and is input to the image forming device 3. The image forming device 3 generates the print matter 8 in which an image is formed based on the no-foil print data 6. After that, the user sets the print matter 8 in the foil stamping device 4. At the time of operating the foil stamping device 4, the user replaces a foil roll 9 having a foil roll width adapted to the position and size of a foil object on the basis of foil roll replacement information notified from the controller 2. The foil stamping device 4 stamps foil to the print matter 8 on the basis of the foil-stamping print data 7. The foil-stamped print matters 8 are properly sorted by the post-process device 4 and output as a foil-stamped print matter 10.

Hardware Configuration of Devices

Figure 2:
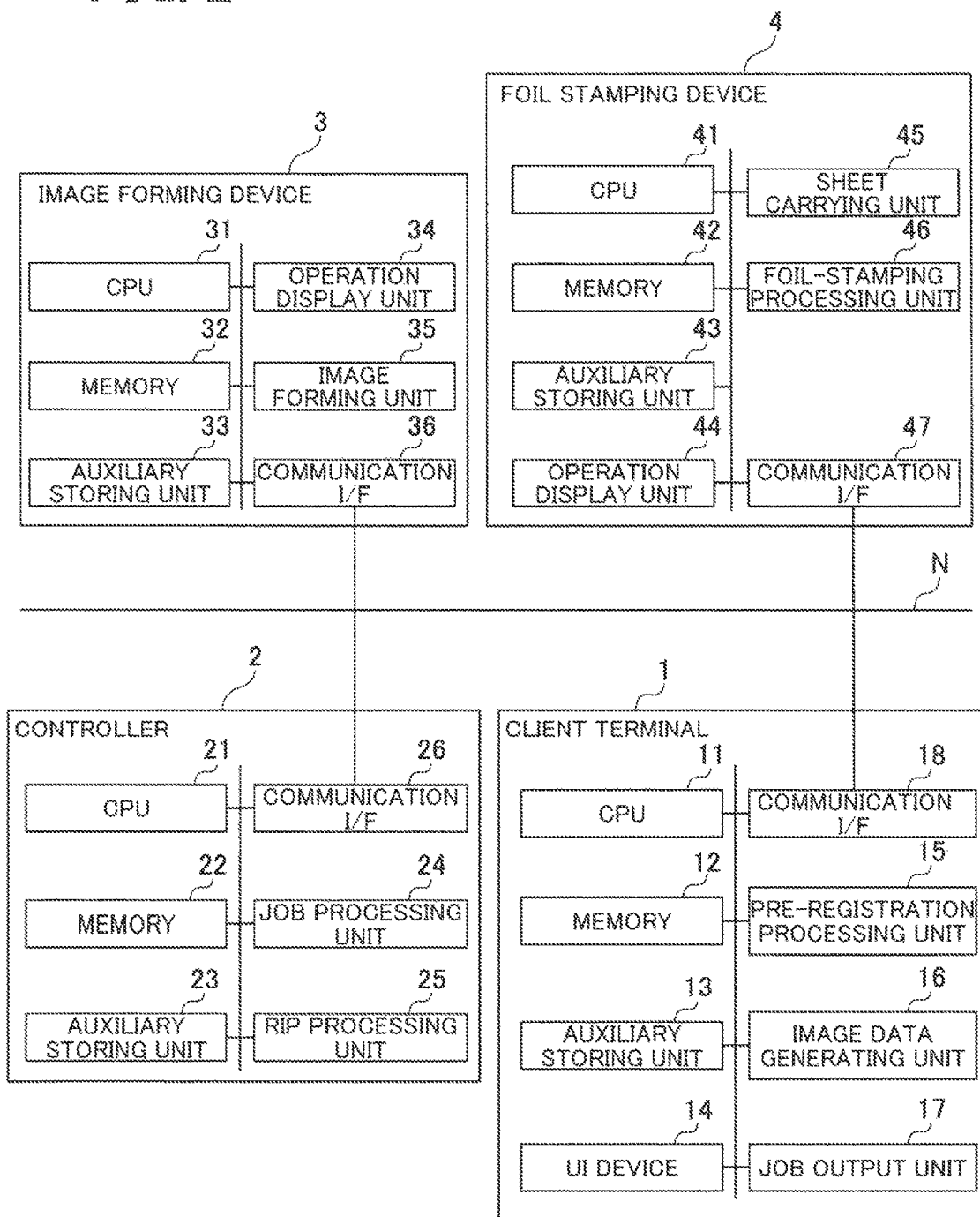
FIG. 2 is a block diagram illustrating a hardware configuration example of devices of the printing system according to the embodiment of the present invention.

FIG. 2 is a block diagram illustrating a hardware configuration example of devices of the printing system 50.

Client Terminal

The client terminal 1 has a CPU (Central Processing Unit) 11, a memory 12 as a volatile recording medium, and an auxiliary storing unit 13 as a nonvolatile recording medium which are coupled to one another via a bus. The client terminal 1 has a user interface device 14, a pre-registration processing unit 15, an image data generating unit 16, a job output unit 17, and a communication I/F 18 (an example of a communication unit). As the client terminal 1, for example, a personal computer device is used.

The CPU 11 is a central processing unit controlling operations of the units of the client terminal 1 and performing arithmetic process, reads a program code of software realizing each of functions related to the embodiment from the auxiliary storing unit 13, and executes it. The client terminal 1 may have a processing device such as an MPU (Micro-Processing Unit) in place of the CPU 11.

The memory 12 is a main storing unit. In the memory 12, a variable, a parameter, or the like generated during the computing process is temporarily written. As the memory 12, a RAM (Random Access Memory) or the like is applied.

The auxiliary storing unit 13 is a storing unit playing an auxiliary role of the memory 12 and has a mechanism capable of usually storing data for long time. As the auxiliary storing unit 13, an HDD (Hard Disk Drive), an SSD (Solid State Drive), a flexible disk, an optical disk, a magnet-optical disk, a CD-ROM (Read Only Memory), a CD-R, a magnetic tape, a nonvolatile memory card, or the like is used. In the auxiliary storing unit 13, an OS (Operating System) and various parameters and, in addition, a program for making the client terminal 1 function are recorded. The auxiliary storing unit 13 is used as an example of a non-transitory recording medium storing a computer-readable program executed by the CPU 11. For example, a program (software) capable of executing the flows illustrated in FIGS. 9 to 11 may be stored in the auxiliary storing unit 13.

The user interface device 14 (an example of a first information presenting unit) is constructed by, for example, a keyboard, a mouse, and the like by which the user can enter an operation, a liquid crystal display by which the user can recognize the screen, or the like. In the diagram, the user interface device 14 is expressed as "UI (User Interface) device". In the user interface device 14, a job group or foil roll replacement information is presented. A job group is a group of jobs or pages which can use the same foil roll 9. The user can instruct execution of a job via the user interface device 14 or confirm a result of execution of a job presented.

The pre-registration processing unit 15 is used to register various parameters in advance in an auxiliary storing unit 23 in the controller 2. The controller 2 executes a predetermined process on the basis of the parameters preliminarily registered.

The image data generating unit 16 generates image data of an image (no-foil image or foil-stamped image) to be printed by the printing system 50 by a document generation or image generation application on the basis of the operation via the user interface device 14 made by the user.

The job output unit 17 generates a job including print setting information (also called "job ticket") and image data and outputs it to the controller 2. The print setting information includes information such as the presence/absence of a foil stamping printing setting and page layout.

As the communication I/F (Interface) 18, for example, an NIC (Network Interface Card) or the like is used and configured to be able to transmit/receive various data among the devices via the network N such as LAN (Local Area Network).

Controller

The controller 2 has a CPU 21, a memory 22 such as a volatile recording medium, and the auxiliary storing unit 23 as a nonvolatile recording medium which are coupled to one another via a bus. The controller 2 also has a job processing unit 24, an RIP processing unit 25, and a communication I/F 26 (an example of the communication unit). As the controller 2, for example, a personal computer device or a server is used.

The CPU 21 is a central processing unit controlling operations of the units of the controller 2, reads a program code of software realizing each of functions related to the embodiment from the auxiliary storing unit 23, and executes it. The controller 2 may have a processing device such as an MPU in place of the CPU 21.

The memory 22 is a main storing unit. In the memory 22, a variable, a parameter, or the like generated during the computing process is temporarily written. As the memory 22, a RAM or the like is applied.

The auxiliary storing unit 23 is a storing unit playing an auxiliary roll of the memory 22 and has a mechanism capable of usually storing data for long time. As the auxiliary storing unit 23, an HDD, an SSD, a flexible disk, an optical disk, a magnet-optical disk, a CD-ROM, a CD-R, a magnetic tape, a nonvolatile memory card, or the like is used. In the auxiliary storing unit 23, an OS (Operating System) and various parameters and, in addition, a program for making the controller 2 function are recorded. The auxiliary storing unit 23 is used as an example of a computer-readable non-transitory recording medium storing a program executed by the CPU 21. For example, a program (software) capable of executing the flows illustrated in FIGS. 10 to 11 may be stored in the auxiliary storing unit 23.

The job processing unit 24 generates the no-foil print data 6 and the foil-stamping data 7 from print data included in a job which is input to the controller 2. The no-foil print data 6 and the foil-stamping print data 7 are supplied to the RIP processing unit 25.

The RIP processing unit 25 performs RIP (Raster Image Processor) process of converting the no-foil print data 6 in which a printing setting is reflected on the basis of the print setting information of the job to a language (PDL: Page Description Language) which can be recognized by the image forming device 3. Languages which can be recognized by the image forming device 3 other than PDL include PCL and PostScript. When the page layout setting is included, the RIP processing unit 25 assigns the no-foil print data 6 on the basis of the number of layouts and arrangement written in the page layout setting. Similarly, the RIP processing unit 25 reflects the print setting in the foil-stamping print data 7, converts the foil-stamping print data 7 to a language which can be recognized by the foil stamping device 4, and outputs the result.

As the communication I/F 26, for example, NIC or the like is used. The communication I/F 26 is configured so as to be able to transmit/receive various data among devices via the network N such as LAN.

Image Forming Device

The image forming device 3 receives a job output from the client terminal 1 via the network N, forms an image on the basis of the print setting of the job and the no-foil print data 6, and outputs the resultant (hereinbelow, "printing process"). The image forming device 3 may be a multi functional peripheral (MFP) having a plurality of kinds of functions (printing function, copying function, scanning function, and the like).

The image forming device 3 has a CPU 31, a memory 32, an auxiliary storing unit 33, an operation display unit 34, an image forming unit 35, and a communication I/F 36.

The CPU 31 is a central processing unit controlling operations of the units of the image forming device 3 and performing arithmetic process, reads a program code of software realizing each of functions related to the embodiment from the auxiliary storing unit 33, and executes it. The image forming device 3 may have a processing device such as an MPU (Micro-Processing Unit) in place of the CPU 31.

The memory 32 is a main storing unit. In the memory 32, a variable, a parameter, or the like generated during the computing process is temporarily written. As the memory 32, a RAM or the like is applied.

The auxiliary storing unit 33 is a storing unit playing an auxiliary roll of the memory 32 and has a mechanism capable of usually storing data for long time. As the auxiliary storing unit 33, an OS and various parameters and, in addition, a program for making the image forming device 3 function are recorded. The auxiliary storing unit 33 is used as an example of a computer-readable non-transitory recording medium storing a program executed by the CPU 31.

The operation display unit 34 is configured by stacking a touch panel as an operation unit over a flat panel display as a display unit. The operation display unit 34 generates an operation signal according to the operation input from the user and supplies the generated operation signal to the CPU 31. The operation display unit 34 displays a process result of the CPU 31.

The image forming unit 35 forms an image on a sheet on the basis of the no-foil print data 6 transmitted from the controller 2. The image forming unit 35 is configured as a printer engine.

As the communication I/F 36, for example, an NIC or the like is used and configured so as to be able to transmit/receive various data among the devices via the network N.

Foil Stamping Device

The foil stamping device 4 reads the foil-stamping print data 7 transmitted from the controller 2, applies varnish to a position in a sheet corresponding to each of pixels of a foil image constructing the foil-stamping print data 7, and makes foil adhere (stamped) over the varnish.

The foil stamping device 4 has a CPU 41, a memory 42, an auxiliary storing unit 43, an operation display unit 44, a sheet carrying unit 45, a foil-stamping processing unit 46, and a communication I/F 47.

The CPU 41 is a central processing unit controlling operations of the units of the foil stamping device 4, reads a program code of software realizing each of functions related to the embodiment from the auxiliary storing unit 43, and executes it. The foil stamping device 4 may have a processing device such as an MPU in place of the CPU 41.

The memory 42 is a main storing unit. In the memory 42, a variable, a parameter, or the like generated during the computing process is temporarily written. As the memory 42, a RAM or the like is applied.

The auxiliary storing unit 43 is a storing unit playing an auxiliary roll of the memory 42 and has a mechanism capable of usually storing data for long time. In the auxiliary storing unit 43, an OS and various parameters and, in addition, a program for making the foil stamping device 4 function are recorded. The auxiliary storing unit 43 is used as an example of a computer-readable non-transitory recording medium storing a program executed by the CPU 41.

The operation display unit 44 (an example of a second information presenting unit) is configured by stacking a touch panel as an operation unit over a flat panel display as a display unit. The operation display unit 44 generates an operation signal according to an operation input from the user and supplies the generated operation signal to the CPU 41. The operation display unit 44 displays a process result of the CPU 41.

The sheet carrying unit 45 carries a sheet which is set in a manual feed tray or sheet feed tray (not illustrated) of the foil stamping device 4 by the user.

The foil-stamping processing unit 46 applies varnish on a sheet on the basis of the foil-stamping print data 7 constructed by a foil image, performs foil stamping while driving the foil roll 9, and makes foil adhere over the varnish.

As the communication I/F 47, for example, NIC or the like is used. The communication I/F 47 is configured to be able to transmit/receive various data among devices via the network N.

Figure 3:
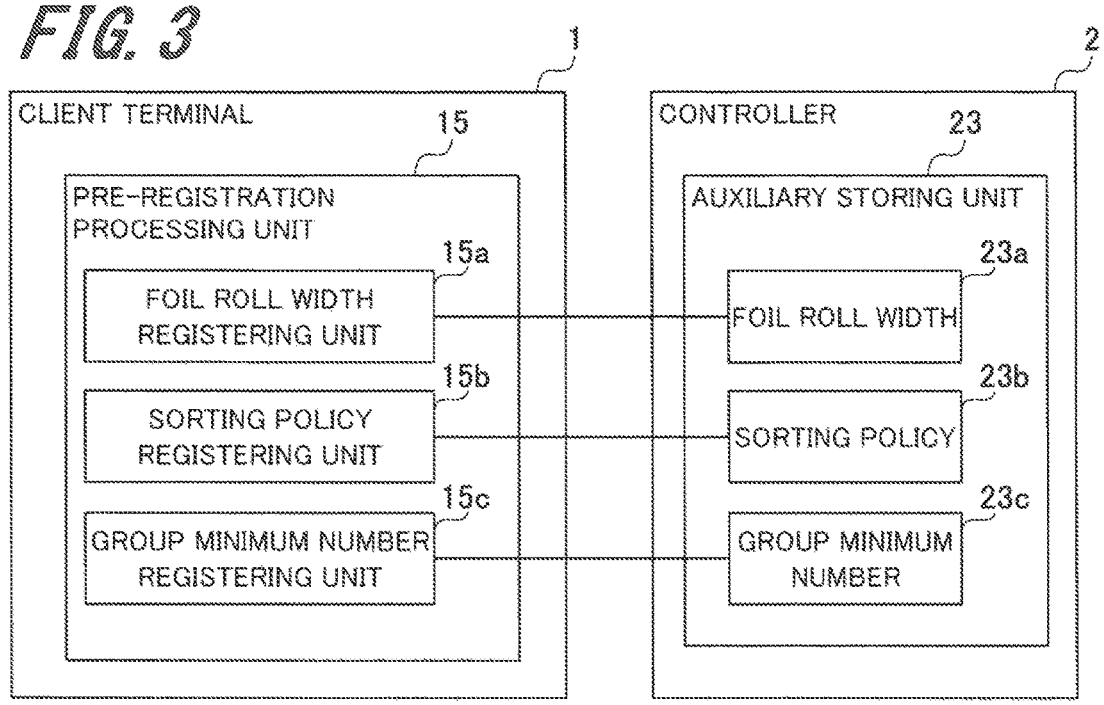
FIG. 3 is a block diagram illustrating a detailed example of a pre-registration processing unit of a client device and an auxiliary storing unit of a controller according to the embodiment of the present invention.

FIG. 3 is a block diagram illustrating a detailed example of the pre-registration processing unit 15 of the client device 1 and the auxiliary storing unit 23 of the controller 2.

The pre-registration processing unit 15 has a foil roll width registering unit 15a, a sorting policy registering unit 15b, and a group minimum number registering unit 15c.

The foil roll width registering unit 15a registers a foil roll width 23a in the auxiliary storing unit 23 of the controller 2. When the user holds the foil rolls 9 of a plurality of kinds of foil roll widths, the foil roll widths 23a of all of the kinds are registered in the auxiliary storing unit 23 of the controller 2.

The sorting policy registering unit 15b registers a sorting policy 23b in the auxiliary storing unit 23 of the controller 2. The sorting policy 23b is referred to when the controller 2 sorts jobs so that the number of times of replacing the foil roll 9 decreases. The following (1) to (3) are examples of the sorting policy 23b.
(1) Priority is placed on the present foil roll configuration (set position of the foil roll 9).
(2) Priority is placed on a job whose deadline is close.
(3) Priority is placed on a job of large number of printing sheets As written in (1), in the sorting policy 23b, sorting of jobs on the basis of the set position of the foil roll 9 which is set in the foil stamping device 4 is specified. When priority is placed on the present foil roll configuration in the foil stamping device 4, a job group including a job in which the set position of the present foil roll 9 does not have to be changed is executed first. Consequently, it is unnecessary to change the position of the foil roll 9 which is already set in the foil stamping device 4 at the start time point of foil printing by the foil stamping device 4.

As written in (2), when jobs are sorted so as to preferentially execute a job whose deadline is close on the basis of job deadline information, a job group including a job whose deadline is the shortest is executed first. Consequently, time that the user obtains the foil-stamped print matter 10 becomes shorter, and the foil-stamped print matter 10 can be delivered before the deadline.

As written in (3), when priority is placed on a job having large number of printing sheets on the basis of the job printing sheets, for example, in the case where there are a job of 1000 sheets and a job of 10 sheets belonging to different job groups, by preferentially stamping-foil printing the job of 1000 sheets as the job of the larger number of printing sheets, the number of times of replacing the foil roll 9 can be decreased. For example, when the foil stamping printing is performed first on a job of smaller number of printing sheets, a job separately supplied cannot be grouped with a job of smaller number of printing sheets to form one job group. However, when the foil-stamping printing is performed first from a job of larger number of printing sheets, there is the possibility that a job separately supplied can be grouped with a job of smaller number of printing sheets and, some cases, the number of times of replacing the foil roll 9 can be decreased. To decrease the number of times of replacing the foil roll 9 as described above, it is effective to perform the foil-stamping printing preferentially on a job of large number of printing sheets.

The priority may be placed on the sorting policy 23b itself in the order of (1) to (3). Such priority of the sorting policy 23b can be set by the user.

The group minimum number registering unit 15c registers a group minimum number 23c in the auxiliary storing unit 23 in the controller 2. The group minimum number 23c is a value obtained as a threshold value of grouping. Generally, there is tendency that the smaller the group minimum number 23c is, the larger the number of times of replacing the foil roll 9. The larger the group minimum number 23c is, the number of times of replacing the foil roll 9 decreases. However, the discarding amount of the foil roll 9 including unused foil increases.

For example, it is assumed that there are job A of foil-stamping printing of 1000 pages and job B of foil-stamping printing of one page. It is assumed here that a foil object in the job A is formed in an entire sheet and a foil object in the job B is formed in a small part of a sheet. However, it takes time and cost for a work of replacing the foil roll at the timing of switching between the jobs A and B, so that the jobs A and B are grouped so that the foil roll used in the job B can be used also in the job A. At this time, when the number of jobs in which a foil object is small is equal to or less than the grouping minimum number 23c (for example, 100 sheets), a grouping unit 24c illustrated in FIG. 4 which will be described later groups a plurality of jobs having different sizes of foil objects.

Figure 4:
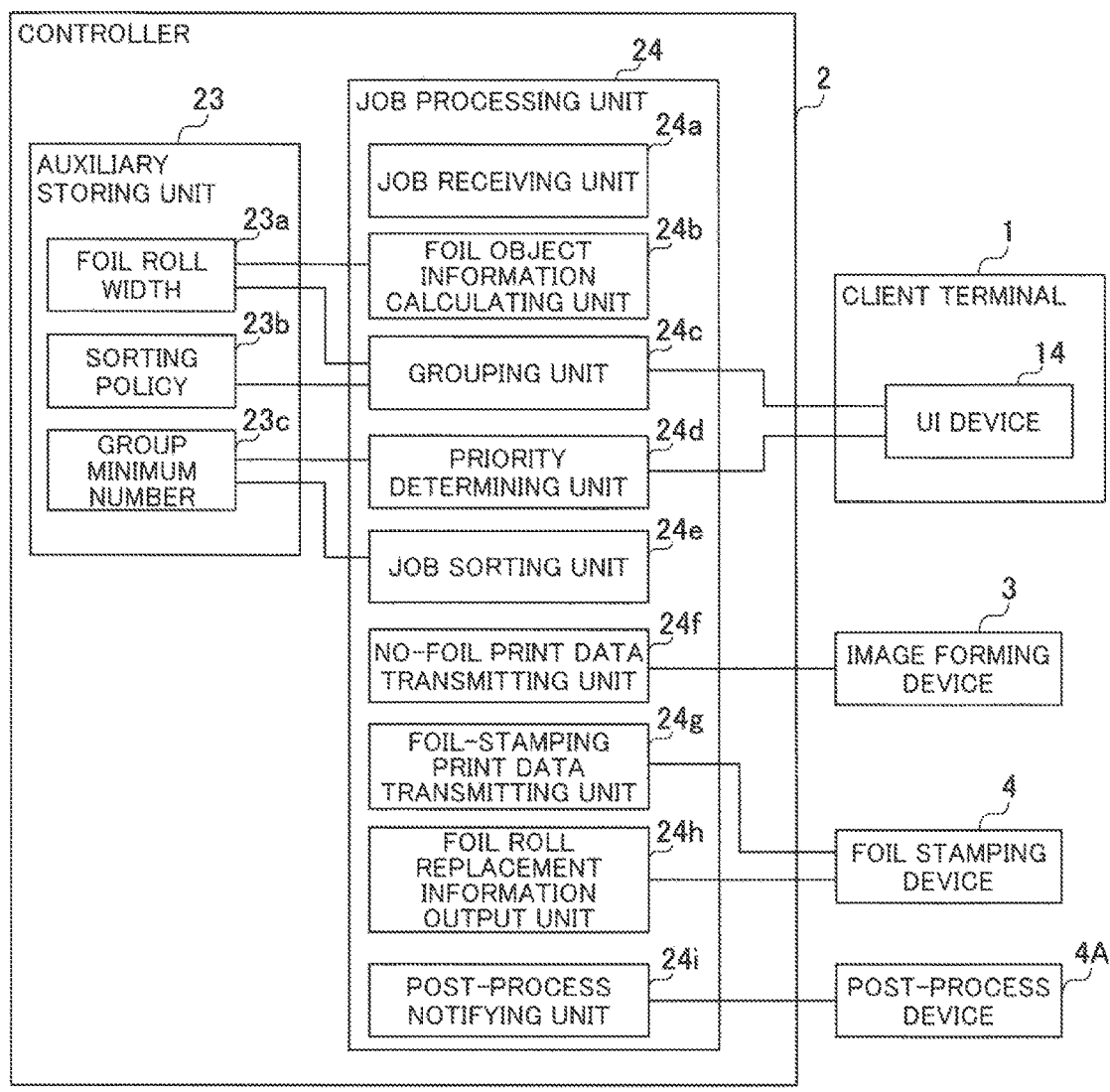
FIG. 4 is a block diagram illustrating a detailed internal configuration example of a job processing unit of a controller according to the embodiment of the present invention.

FIG. 4 is a block diagram illustrating a detailed internal configuration example of the job processing unit 24 of the controller 2.

The job processing unit 24 has a job receiving unit 24a, a foil object information calculating unit 24b, the grouping unit 24c, a priority determining unit 24d, a job sorting unit 24e, a no-foil print data transmitting unit 24f, a foil-stamping print data transmitting unit 24g, a foil roll replacement information output unit 24h, and a post-process notifying unit 24i.

The job receiving unit 24a receives a plurality of jobs from the client terminal 1 via the communication I/F 26 and writes the jobs into the memory 22.

The foil object information calculating unit 24b calculates foil object information including the position and size of a foil object in the direction orthogonal to the feed direction of a sheet supplied to the foil stamping device 4 on the basis of the foil-stamping print data 7 extracted from print data included in a job read from the memory 22. The calculating process is performed with reference to the foil roll width 23a stored in the auxiliary storing unit 23.

The grouping unit 24c groups the jobs on the basis of the foil roll 9 which can be attached to the foil stamping device 4 and the position and size of the foil object. The grouping unit 24c groups the jobs with reference to the foil roll width 23a and the group minimum number 23c stored in the auxiliary storing unit 23. The result of the grouping of the foil objects is transmitted to the client terminal 1 and can be recognized by the user in the user interface device 14 of the client terminal 1.

The priority determining unit 24d determines priority indicating the execution order on the job group unit basis. The priority determining unit 24d determines the priority with reference to the sorting policy 23b and the group minimum number 23c stored in the auxiliary storing unit 23. The determined priority is transmitted to the client terminal 1 and can be recognized by the user in the user interface device 14 of the client terminal 1. The user can change the priority.

The job sorting unit 24e sorts the jobs grouped by the grouping unit 24c in accordance with the priority determined by the priority determining unit 24d by each job group. The job sorting unit 24e sorts the jobs so that the foil stamping device 4 can execute jobs in the same job group successively and the job group having the high priority can be executed first.

The no-foil print data transmitting unit 24f transmits the no-foil print data 6 which is extracted from the print data by the job receiving unit 24a and does not include a foil object to the image forming device 3. The image forming device 3 performs an image forming process (also called printing process) forming an image on a sheet in accordance with the no-foil print data 6.

The foil-stamping print data transmitting unit 24g transmits the foil-stamping print data 7 including the foil object, extracted from the print data by the job receiving unit 24a to the foil stamping device 4.

The foil roll replacement information output unit 24h outputs foil roll replacement information indicating a timing that the foil roll 9 is replaced. In the embodiment, the timing that the foil roll 9 is replaced is the same as the timing that a job group changes. The foil roll replacement information output unit 24h outputs the roll replacement information to the user interface device 14 or transmits the roll replacement information to the foil stamping device 4 and makes the operation display unit 44 (an example of a second information presenting unit) of the foil stamping device 4 present the foil roll replacement information. Consequently, the user who recognizes the foil roll replacement information by the client terminal 1 or the foil stamping device 4 can replace the foil roll 9 which is set in the foil stamping device 4 at the timing that the job group changes.

When the post-process device 4A capable of sorting sheets every job or page is provided for the foil stamping device 4, the post-process notifying unit 24i notifies the post-process device 4A of post-process information including the result of sorting the jobs. The post-process notifying unit 24i notifies the job sorting result and makes the post-process device 4A execute sorting of the foil-stamped sheets to the original order. The post-process device 4A performs a post process (for example, sorting process and folding process) on the foil-stamped print matters in accordance with the notified post-process information.

Figure 5:
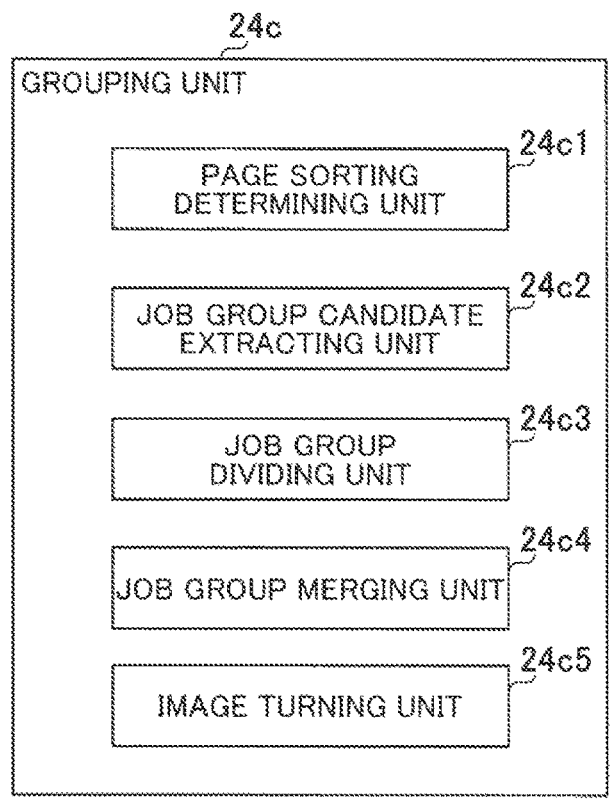
FIG. 5 is a block diagram illustrating an internal configuration example of a grouping unit according to the embodiment of the present invention.

FIG. 5 is a block diagram illustrating an internal configuration example of the grouping unit 24c.

The grouping unit 24c has a page sorting determining unit 24c1, a job group candidate extracting unit 24c2, a job group dividing unit 24c3, a job group merging unit 24c4, and an image turning unit 24c5.

The page sorting determining unit 24c1 determines whether page sorting can be performed or not on each page included in a job and sorts sortable pages. For example, the page sorting determining unit 24c1 determines whether page sorting can be performed or not by the setting by the user or depending on whether the post-process device 4A having the sorting function is coupled to the foil stamping device 4 or not.

The job group candidate extracting unit 24c2 extracts jobs which can be grouped every foil roll width of the foil roll 9 which can be set in the foil stamping device 4.

The job group dividing unit 24c3 divides jobs which can be foil-stamped by the foil roll 9 set in the foil stamping device 4 from the job group candidates extracted by the job group candidate extracting unit 24c2 and determines the job group including the job.

The job group merging unit 24c4 merges a job which is included in the job group and in which the number of sheets is equal to or less than the designated number to another job group subjected to foil stamping printing by using the foil roll 9 having foil roll width larger than that of the foil roll 9 used for job foil stamping printing.

The image turning unit 24c5 turns an image in a page in which a foil object is formed at an arbitrary angle so that the foil stamping printing is performed in accordance with the set position of the foil roll 9 which is set in the foil stamping device 4. For example, the image turning unit 24c5 performs a process of turning the image of the entire the page by 180° so as to set the position of the foil object to the set position of the roil roll 9. At this time, as illustrated by the broken line on the job C in FIG. 7 which will be described later, a process of turning the job C by 180° in a direction perpendicular to the sheet passing direction is performed on the job C in FIG. 7 as will be described later. The image turning unit 24c5 may perform a process of turning an image of an entire page by 90° or 270° clockwise.

Configuration Example of Foil Roll

Figure 6:
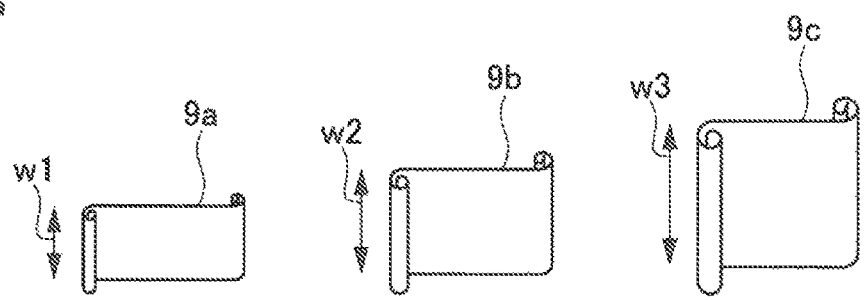
FIG. 6 is an explanatory diagram illustrating configuration example of a foil roll according to the embodiment of the invention.

FIG. 6 illustrates a configuration example of the foil roll 9. Comparative examples of the sizes of three kinds of foil rolls 9 of different foil roll widths are illustrated in the upper part in FIG. 6, and examples of the foil roll widths of the foil rolls 9 are illustrated in the lower part in FIG. 6.

In the upper part in FIG. 6, foil rolls 9a, 9b, and 9c are illustrated in the descending order of the foil roll width.

In the table illustrated in the lower part in FIG. 6, values of foil roll widths w1 to w3 corresponding to the foil rolls 9a to 9c are stored. In the table, the foil rolls 9a, 9b, and 9c are called foil rolls A, B, and C, respectively. As illustrated in the table, for example, the foil roll width w1 of the foil roll 9a is 148 mm, the foil roll width w2 of the foil roll 9b is 210 mm, and the foil roll width w3 of the foil roll 9c is 297 mm. Hereinafter, an example of executing sorting of the jobs by using the foil rolls 9a to 9c illustrated in FIG. 6 will be described.

First Example of Job Sorting

Next, description will be given by illustrating a first example of sorting jobs in FIG. 7 and illustrating a second example of sorting jobs in FIG. 8.

FIG. 7 is an explanatory diagram illustrating a first example of sorting of jobs. In this example, foil objects 61a to 61d used in four kinds of jobs A to D are illustrated.

In the upper part in FIG. 7, the positions and sizes of the foil objects 61a to 61d printed on sheets 60 are illustrated in the jobs A to D in order from the left. The positions and sizes of the foil objects 61a to 61d are one-dimensional information. The sheets 60 are passed through the foil stamping device 4 along the sheet passing direction from the right to left in the diagram. The sizes of the sheets 60 used in the jobs A to D are the same. In each of the jobs A to D, foil-stamping printing based on foil objects is performed in the same position in 100 sheets 60. On the left side of the upper part in FIG. 7, the foil roll widths of the foil rolls 9a and 9c are illustrated.

In the jobs A to D, the shapes of the foil objects 61a to 61d are expressed by hatched rectangular frames. Offset of the foil objects 61a to 61d is determined based on the length from the bottom part of the sheet 60 to the bottom part of each of the foil objects 61a to 61d. At the bottom side of the sheet 60, a reference line 65 as a reference of offset is illustrated. The foil object widths of the foil objects 61a to 61d are determined based on the lengths from offsets to the upper parts of the foil objects 61a to 61d.

In the intermediate part in FIG. 7, the values of offsets and the foil object widths of the jobs A to D are stored. For example, in the job A, offset 62a of the foil object 61a is 240 mm, and foil object width 63a is 50 mm.

The relations between the foil rolls 9a to 9c illustrated in FIG. 6 and the foil objects 61a to 61d in FIG. 7 will be described. Conventionally, the foil stamping device 4 executes jobs in order of the jobs A to D supplied to the controller 2. In the case of the job A, the foil object width 63a is 50 mm. When the foil roll 9a having the foil roll width of 148 mm is used, foil stamping printing adapted to the position of the foil object 61a of the job A and the foil object width can be performed. However, since the foil object width 63b of the job B is 280 mm, in the foil roll 9a, the foil stamping printing cannot be performed in the foil object 61b. Consequently, the foil roll 9c whose foil roll width is 297 mm is replaced to the foil roll 9a.

Next, although the foil object width 63c of the job C is 50 mm, in the foil roll 9c, a discarding amount of the foil roll 9c after the foil stamping printing is large. Consequently, the foil roll 9c is again replaced to the foil roll 9a. Since the position of the foil object 61c is different from that of the foil object 61a, the position of the foil roll 9a replaced in the job C is the bottom side of the sheet 60 according to the offset 62c.

Next, since the foil object width 63d of the job D is 100 mm, by using the foil roll 9a whose foil roll width is 148 mm, foil stamping printing adapted to the foil object 61d of the job D can be performed. Although the foil roll 9a is set on the lower side of the sheet 60 in the job C, in the job D, if the foil roll 9a is not set on the upper side of the sheet 60, foil stamping printing cannot be performed so as to be adapted to the foil object 61d of the job D. Consequently, the foil roll 9a is moved in the direction (upper direction of the sheet 60) perpendicular to the sheet passing direction. In the conventional foil stamping printing as described above, the foil roll 9 has to be frequently moved and replaced in accordance with the position and size of the foil object.

Therefore, in the embodiment, the job sorting unit 24e changes the job execution order as illustrated in the lower part in FIG. 7. In the job C, a foil object 61e obtained by turning the foil object 61c by 180° by the image turning unit 24c5 is expressed by the broken-line rectangular frame.

For example, when the jobs are sorted in the order of the jobs A and D, the job D can be used without moving the foil roll 9a set in the job A in a direction perpendicular to the sheet passing direction. When the job C is executed after the job D, it is sufficient to move the foil roll 9a from the upper side to the lower side of the sheet 60. After that, at the time of executing the job B after the job C, it is sufficient to replace the foil roll 9a to the foil roll 9c. Consequently, although foil roll replacement is necessary twice between the jobs A and B and between the jobs B and C when the jobs are executed in the order of A, B, C, and D in a conventional manner, when the jobs are executed in the order of the jobs A, D, C, and B as the embodiment, only one foil roll replacement is sufficient between the jobs C and B. It is therefore considered that re-sorting of the job execution order is effective to decrease the number of times of replacing the foil roll 9 and to reduce the discarding amount of the foil roll 9.

In the job C, when the image turning unit 24c5 turns the foil object 61c to the position of the foil object 61e by 180°, an offset of the foil object 61e in the job C changes. The jobs A, D, and C can be set in the same job group in which the foil roll 9a can be used. Since many jobs are included in the same job group as described above, after execution of the jobs A and D, the job C can be executed without moving the foil roll 9a. Consequently, the time and effort for the foil stamping device 4 by the user can be further decreased.

Second Example of Job Sorting

FIG. 8 is an explanatory diagram illustrating a second example of sorting jobs. In the example, the foil objects 61a, 61b, and 61d used in the three kinds of jobs A, B, and D are illustrated. In each of the jobs A, B, and D, printing of 100 pages is performed. In the job A, the foil object 61a is formed only in the final page of 100 pages. In the job D, the foil object 61d is formed only in the first page of 100 pages.

As a precondition, it is assumed that the user cannot replace the foil roll 9 between jobs and can replace the foil roll 9 during printing pages in a job. Consequently, the foil roll replacement information output unit 24h outputs foil roll replacement information that a timing that the foil roll 9 is replaced during a job.

When the jobs are executed in the order of the jobs A, B, and D as illustrated in the upper part in FIG. 8, the foil roll 9a cannot be replaced to the foil roll 9c between the jobs A and B. Consequently, the jobs are re-sorted so that the jobs are executed in the order of the jobs A, D, and B as illustrated in the lower side of FIG. 8. At this time, the final page of the job A and the first page of the job D are grouped in the same job group by the grouping unit 24c. Therefore, in the final page of the job A and the first page of the job D, the foil stamping printing is performed by the same foil roll 9a. After that, by replacing the foil roll 9a with the foil roll 9c during execution of the job D, the foil stamping printing of the job B is performed. By replacing the job execution order as described above, it is unnecessary to replace the foil roll 9 between jobs.

Hereinafter, the process for sorting the order of executing jobs in the job processing unit 24 will be described. The processes by the devices constructing the printing system 50 will be described here in the order of pre-registering process, foil stamping printing process, and job grouping process.

Pre-Registering Process

Figure 9:
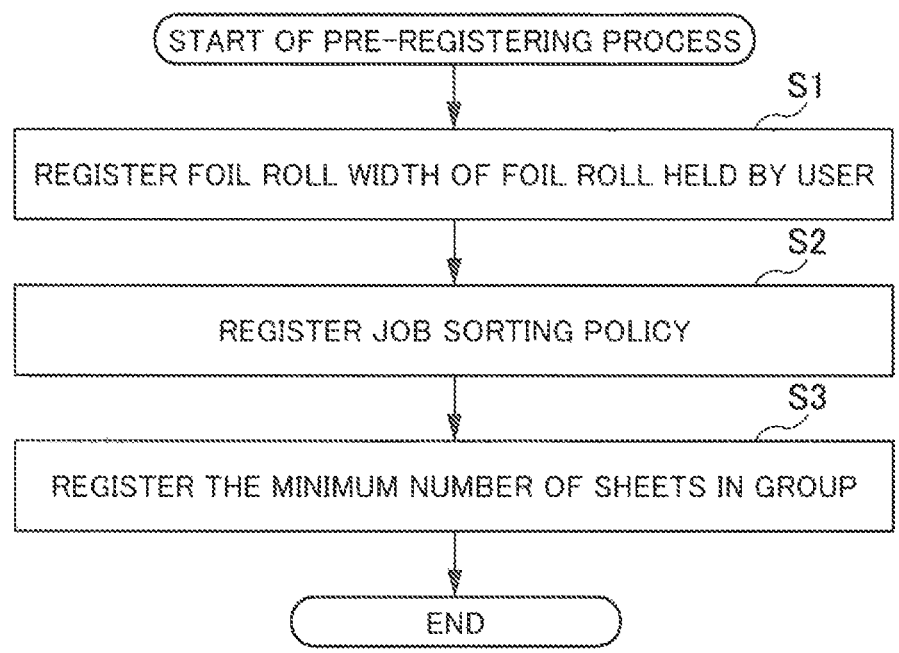
FIG. 9 is a flowchart illustrating an example of pre-registration process of various information performed by using a client terminal according to the embodiment of the invention.

FIG. 9 is a flowchart illustrating an example of pre-registration process of various information performed by using the client terminal 1. The process is performed by user by operating the user interface device 14 of the client terminal 1.

First, the user registers the foil roll width of the foil roll 9 of the user (S1). The foil roll width of the foil roll 9 is registered as the foil roll width 23a in the auxiliary storing unit 23 of the controller 2 by the foil roll width registering unit 15a.

Next, the user registers the job sorting policy (S2). The job sorting policy is registered as the sorting policy 23b in the auxiliary storing unit 23 of the controller 2 by the sorting policy registering unit 15b.

The user registers the group minimum number as the minimum number of sheets included in the same job group (S3). The group minimum number is registered as the group minimum number 23c in the auxiliary storing unit 23 of the controller 2 by the group minimum number registering unit 15c.

(General) Process at the Time of Printing

Next, an example of general process at the time of printing in the printing system 50 will be described.

Figure 10:
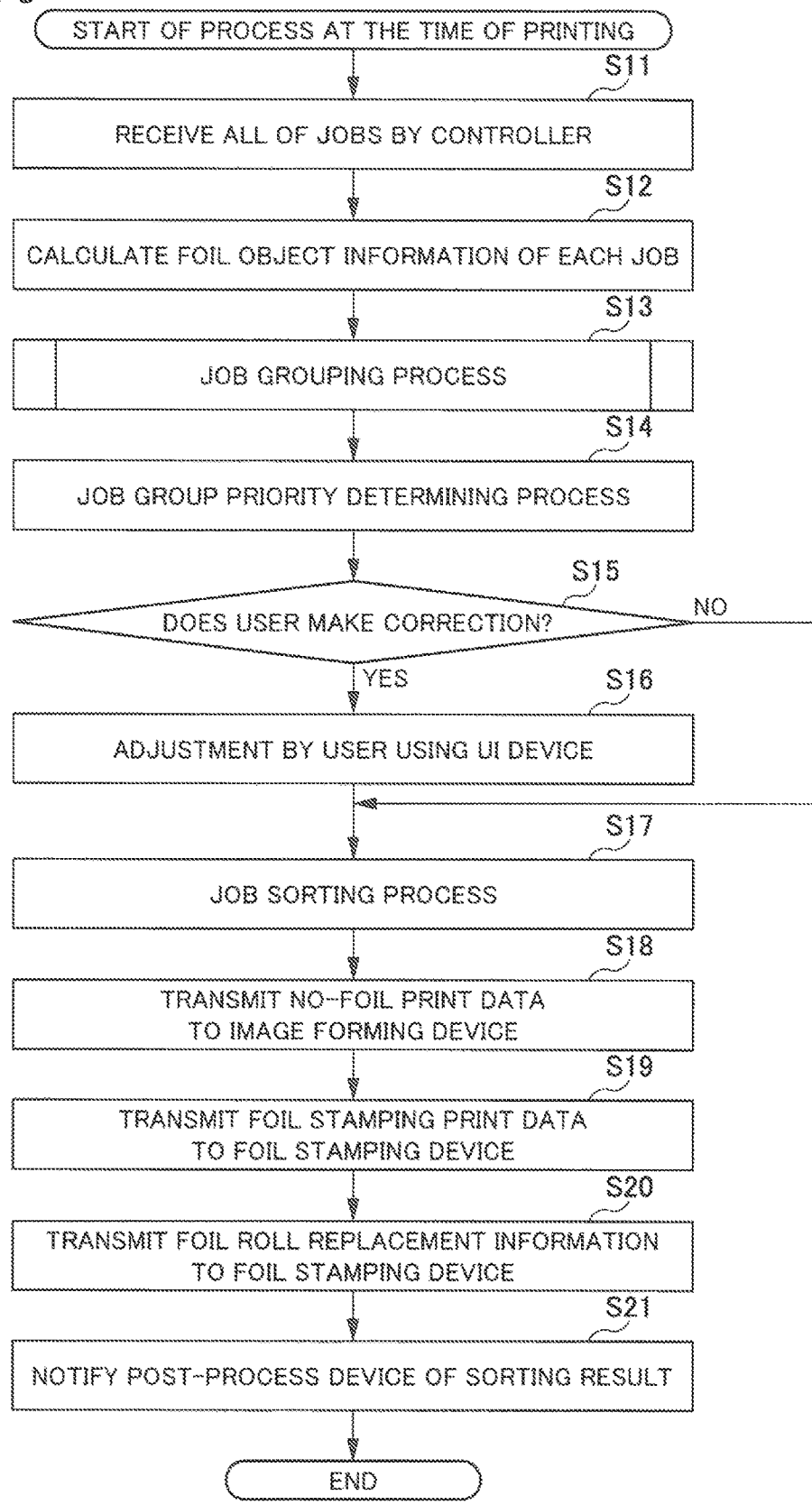
FIG. 10 is a flowchart illustrating an example of process at the time of printing performed by the printing system according to the embodiment of the invention.

FIG. 10 is a flowchart illustrating an example of process at the time of printing performed by the printing system 50.

First, the job receiving unit 24a of the job processing unit 24 in the controller 2 receives all of jobs used for foil stamping printing via the communication I/F 26 by using an arbitrary protocol from the client terminal 1 used by the user (S11).

Next, the foil object information calculating unit 24b of the job processing unit 24 calculates the foil object information on the basis of foil stamping print data extracted from each job (S12). As illustrated in FIG. 7, the foil object information calculating unit 24b calculates foil object information including the position and size of a foil object on the basis of the direction orthogonal to the sheet feeding direction.

The grouping unit 24c of the job processing unit 24 performs a job grouping process and determines a job group on the basis of the position and size of the foil object in each job calculated (S13). The details of the job grouping process will be described with reference to FIG. 11 later.

The priority determining unit 24d of the job processing unit 24 determines the priority of each job group (S14). Determination of priority is executed according to the sorting policy 23b set by the user.

In the user interface device 14 of the client terminal 1, the result of grouping and the determined priority are presented. Based on the presented result, the user determines whether the result of grouping and the priority are corrected or not (S15). When the user determines that the result of grouping and the determined priority are not corrected (NO in S15), the system advances to step S17. The step S15 can be skipped.

On the other hand, when the user determines that the result of grouping and the determined priority are corrected (YES in S15), the user performs manual adjustment by the user interface device 14 (S16). The user can perform adjustment of changing a job in a job group through a Web browser displayed in an external device other than the client terminal 1. For example, the adjustment can be performed via a not-illustrated display device of the controller 2, the operation displaying unit 34 of the image forming device 3, and the operation displaying unit 44 of the foil stamping device 4.

The job sorting unit 24e performs the job sorting process on the basis of the grouping result and the priority determined in the steps S13 and S14 (S17). The job sorting unit 24e sorts jobs so that jobs in the same job group can be executed successively and a job group having high priority can be executed first. By setting the manual adjustment in the step S16 after the job sorting process of the step S17, the user may directly change the order of jobs in the job group.

The no-foil print data transmitting unit 24f transmits the no-foil print data 6 to the image forming device 3 in the sorted job order via the communication I/F 26 (S18).

After that, the foil-stamping print data transmitting unit 24g transmits the foil stamping print data 7 in the sorted job order via the communication I/F 26 (S19).

The foil roll replacement information output unit 24h generates replacement information of the foil roll 9 on the basis of the job grouping result. The foil roll replacement information output unit 24h transmits the replacement information of the foil roll 9 to the foil stamping device 4 via the communication I/F 26 (S20). Since the replacement information of the foil roll 9 includes data of instructing replacement of the foil roll 9 at the timing that the job group switches, the user can replace the foil roll 9 at the instructed timing.

The post-process notifying unit 24i notifies the post-process device 4A of the job sorting result (S21) and finishes the process. When the post-process device 4A is not coupled to the foil stamping device 4, the step S21 is skipped.

Process at the Time of Printing (Job Grouping)

Next, the job grouping process will be described.

Figure 11:
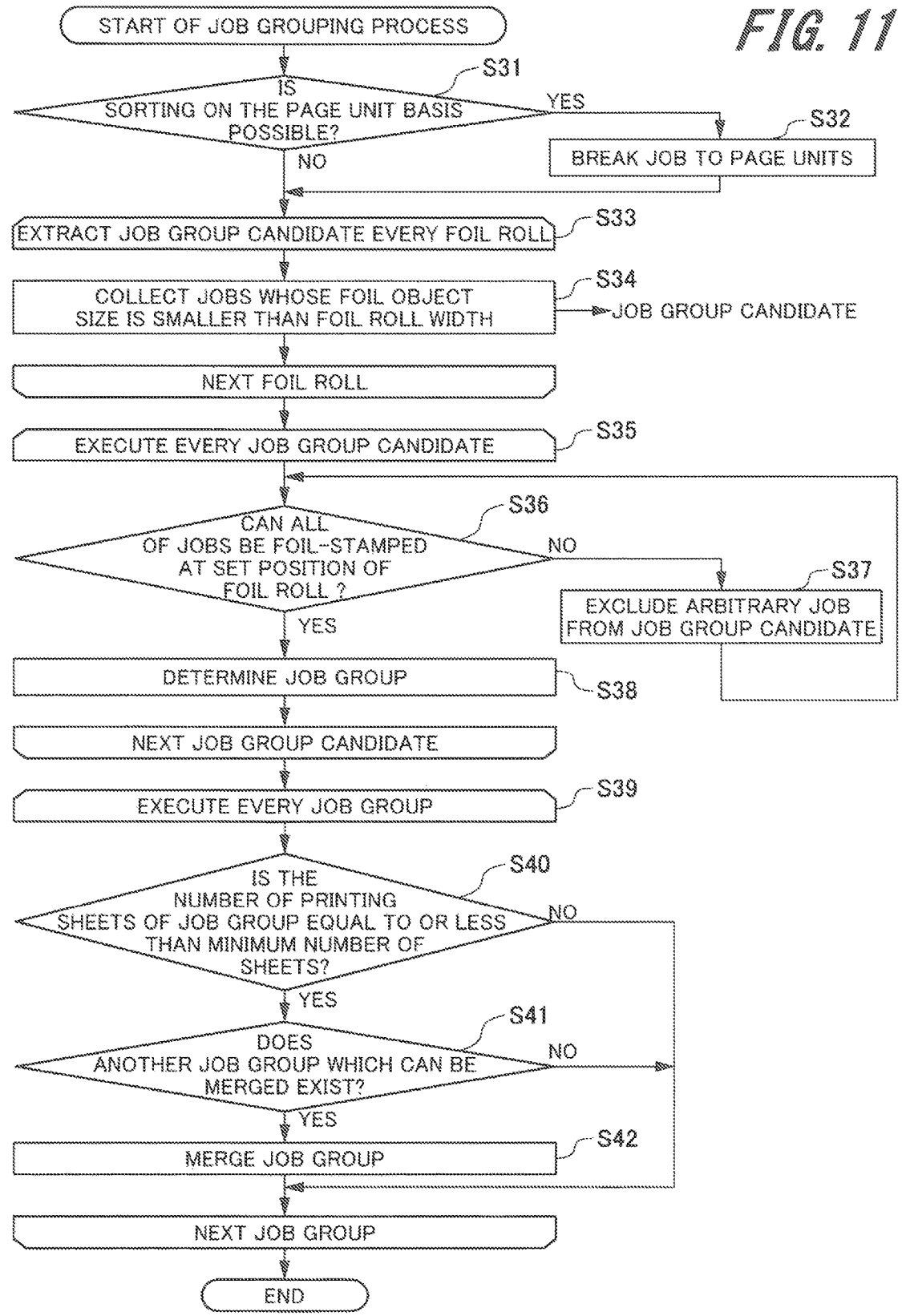
FIG. 11 is a flowchart illustrating the details of a job grouping process performed in step S13 in FIG. 10.

FIG. 11 is a flowchart illustrating the details of the job grouping process performed in step S13 in FIG. 10. The process is performed by each of the units of the grouping unit 24c.

First, the page sorting determining unit 24c1 determines whether jobs can be sorted on the page unit basis or not (S31). For example, when a message that the user can sort jobs on the page unit basis is input via the operation screen, the determination by the page sorting determining unit 24c1 is performed. Also in the case where the post-process device 4A having the sorter function is coupled to the foil stamping device 4, it may be determined that jobs can be sorted on the page unit basis. When jobs cannot be sorted on the page unit basis (NO in S31), the system can advance to the step S33.

When jobs can be sorted on the page unit basis, the page sorting determining unit 24c1 breaks a job on the page unit basis (S32).

After the step S31 or S32, the job group candidate extracting unit 24c2 performs a process of extracting a job group candidate every foil roll width of the foil roll 9 of the user (S33). It is assumed here that information of the foil roll widths is sorted in the descending order. Consequently, in order from the foil roll 9 whose roll width is largest, a job group in which foil stamping printing can be performed by using the foil roll 9 is extracted as a job group candidate.

In the job group candidate extracting process of step S33, the job group candidate extracting unit 24c2 collects jobs in each of which the size of a foil object is smaller than the foil roll width (S34) and stores the collected jobs as a job group candidate into the memory 22 or the like. After the job group candidate is extracted with respect to the foil roll 9 having a certain foil roll width, a process of extracting a job group candidate with respect to the foil roll 9 having the next smallest foil roll width is repeated. It is assumed that all of jobs input from the client terminal 1 to the controller 2 belong to any of job group candidates.

In the example of FIG. 7, a foil object which can be foil-stamping printed is extracted in order from a foil roll 9*c* having the largest foil roll width. The foil objects which can be foil-stamping printed by using the foil roll 9*c* having the largest foil roll width are the foil objects 61*a* to 61*d*. The foil objects which can be foil-stamping printed by using a foil roll 9*b* having the second largest foil roll width are the foil objects 61*a*, 61*c*, and 61*d*. The foil objects which can be foil-stamping printed by using a foil roll 9*a* having the smallest foil roll width are also the foil objects 61*a*, 61*c*, and 61*d*. When the foil roll 9*a* is used, the foil discarding amount can be reduced as compared with the case of using the foil roll 9*b*. Consequently, job group candidates so that the foil objects 61*a*, 61*c*, and 61*d* of the jobs A, C, and D are foil-stamping printed by the foil roll 9*a* and the foil object 61*b* in the job B is foil-stamping printed by the foil roll 9*c* are extracted. Alternatively, foil objects which can be foil-stamping printed in ascending order of the foil roll width may be extracted as job group candidates.

After the repeating process of the step S33 is finished, the job group dividing unit 24*c*3 executes a process of dividing the jobs from the job group candidate and determining jobs included in a job group every job group candidate (S35). In this process, the job group dividing unit 24*c*3 determines whether all of the jobs in the job group candidate can be foil-stamped or not at the position where the foil roll 9 is set (S36). Concretely, the job group dividing unit 24*c*3 determines whether the difference between the maximum value of a value obtained by adding an offset and the sheet width in each job and the minimum value of the offset is smaller than the foil roll width or not.

When all of the jobs cannot be foil-stamped (NO in S36), the job group dividing unit 24*c*3 excludes an arbitrary job which cannot be foil-stamped from the job group candidate (S37), and the system moves again to the determining process of the step S36. When a process of turning an image of an arbitrary job by 180° is permitted in addition to the exclusion of an arbitrary job from a job group candidate, as illustrated by the job C in the lower part of FIG. 7, the image turning unit 24*c*5 turns the image by 180° and the system moves to the determining process of the step S36. The job group dividing unit 24*c*3 calculates again the offset and the sheet width related to the job in which the image is turned and performs a job group determining process.

On the other hand, when all of jobs can be foil-stamped (YES in S36), the job group dividing unit 24*c*3 determines a job group candidate in which all of jobs can be foil-stamped as a job group (S38). When a job group candidate is determined as a job group, a process of determining the following job group candidate as a job group is repeated.

After the repeating process of the step S35 is finished, a merging process of merging a plurality of job groups to one job group is executed by the job group merging unit 24*c*4 on the job group unit basis (S39). For example, when there are a plurality of jobs each of small number of sheets and the positions of foil objects included in the jobs vary among the jobs, it is troublesome to replace the foil roll 9 every job and adjusts the set position of the foil roll 9. For example, when the jobs are executed successively by the foil roll 9*c* having the largest foil roll width illustrated in FIG. 7, the time and labor to replace the foil roll 9 can be eliminated. Consequently, in the step S39, the job group merging process is performed.

In the job group merging process, the job group merging unit 24*c*4 determines whether the number of printing sheets of a job group is equal to or less than the group minimum number 23*c* which is preliminarily set by the user every job group determined in the step S38 (S40). When the number of printing sheets of the job group is equal to or less than the group minimum number 23*c* (NO in S40), the job group merging unit 24*c*4 performs the process of the step S39 for the next job group.

When the number of printing sheets of the job group exceeds the group minimum number 23*c* (YES in S40), the job group merging unit 24*c*4 determines whether there is another job group which can be merged or not (S41). Whether a jog group can be merged or not is determined by whether another job group can include the foil pattern of the present job group or not. When there is no job group which can be merged (NO in S41), the job group merging unit 24*c*4 performs the process of the step S39 for the next job group.

On the other hand, when there is a job group which can be merged (YES in S41), the job group merging unit 24*c*4 merges the job group (S42). When a job group is merged, a process of merging the next job group is repeated. When the process of merging all of job groups is finished, the job grouping process in FIG. 11 is finished, and the process is returned to the step S14 in FIG. 10.

In the printing system 50 according to the embodiment described above, jobs are sorted so that jobs having foil objects which can be foil-stamping printed can be processed successively without replacing the foil roll 9 set in the foil stamping device 4. Consequently, the foil rolls 9 having the same foil roll width can be set successively, the number of times of replacing the foil roll 9 can be made small, and the burden on the user is reduced. The foil roll 9 having the foil roll width adapted to the size of the foil object can be used, and the discarding amount of the foil roll 9 can be decreased, so that the productivity of the foil-stamping printing improves.

Since the job sorting result, the image turning result, the replacement timing of the foil roll 9, and the like are presented in the user interface device 14, the user can easily recognize how a job is processed. Those results may be displayed in the operation display unit 34 of the image forming device 3 or the operation display unit 44 of the foil stamping device 4. Based on the displayed results, for example, the user can perform adjustment such as correcting the job sorting result.

The function blocks of the job processing unit 24 in the controller 2 may be dispersedly provided for the devices of the printing system 50. For example, the client terminal 1 has the function of the job processing unit 24, and the no-foil print data 6 and the foil-stamping print data 7 may be transmitted from the client terminal 1 to the image forming device 3 and the foil stamping device 4. A configuration may be employed such that the controller 2 is not mounted in an office room or the like in which the image forming device 3 and the foil stamping device 4 are set by providing the function of the controller 2 in a cloud server or the like.

In the foregoing embodiment, the environment that the devices of the printing system 50 are coupled via the network N has been described. It is also possible to copy print data to a recording medium such as a USB (Universal Serial Bus) memory and input the print data by inserting the USB memory to the image forming device 3 and the foil stamping device 4.

According to the present invention, the number of times of replacing the foil roll can be decreased and the foil roll discarding amount can also be decreased, so that productivity in the foil-stamping printing improves.

The present invention is not limited to the foregoing embodiments but, obviously, can employ other applications and modifications as long as it does not depart from the gist of the present invention described in the scope of the claims for patent.

For example, in the foregoing embodiments, the configurations of the device and the system are specifically and concretely described to plainly explain the present invention, and the invention is not limited to a configuration having all of the components described. A part of the components of the embodiments described may be replaced with a component of another embodiment and, further, a component of another embodiment can be added to the configuration of any of the embodiments. With respect to a part of the components of each of the embodiments, another component may be added, deleted, or replaced.

The control lines and information lines which are considered to be necessary for description are illustrated and all of control lines and information lines are not always illustrated in products. It may also be considered that all of the components are mutually coupled in practice.

Although the embodiments of the present invention have been described and illustrated in detail, the disclosed embodiments are made for purposes of illustration and example only and not limitation. The scope of the present invention should be interpreted by terms of the appended claims.

REFERENCE SIGNS LIST 1 client terminal
2 controller
3 image forming device
4 foil stamping device
4A post-process device
5 job
6 print data
7 foil-stamping print data
8 print matter
9 foil roll
10 foil-stamped print matter
24 job processing unit
24a job receiving unit
24b foil object information calculating unit
24c grouping unit
24d priority determining unit
24e job sorting unit
24f no-foil print data transmitting unit
24g foil-stamping print data transmitting unit
24h foil roll replacement information output unit
24i post-process notifying unit

What is claimed is:

1. An information processing device comprising:
a foil object information calculating unit calculating foil object information including position and size of a foil object in a direction orthogonal to a feeding direction of a sheet which is fed to a foil stamping device on the basis of foil-stamping print data extracted from print data included in a plurality of jobs;
a grouping unit grouping the jobs on the basis of a foil roll which can be attached to the foil stamping device and the foil object information;
a job sorting unit sorting the grouped jobs on the basis of a preliminarily specified sorting policy by group;
a foil-stamping print data transmitting unit transmitting the foil-stamping print data including the foil object which is extracted from the print data and is for stamping foil to the sheet on which an image is formed;
a no-foil print data transmitting unit transmitting no-foil print data which is extracted from the print data and does not include the foil object to an image forming device for forming the image on the sheet; and
a foil roll replacement information output unit outputting foil roll replacement information indicating a timing that the foil roll is replaced.

2. The information processing device according to claim 1, further comprising a first information presenting unit presenting the foil roll replacement information,
wherein the foil roll replacement information output unit outputs the roll replacement information to the first information presenting unit or transmits the roll replacement information to the foil stamping device, and makes a second information presenting unit of the foil stamping device present the foil roll replacement information.

3. The information processing device according to claim 2, further comprising a merging unit merging the job which is included in the group and in which the number of sheets is equal to or less than designated number of sheets to another group to which foil-stamping printing is performed by using a foil roll having a foil roll width larger than that of the foil roll used for the foil-stamping printing of the job.

4. The information processing device according to claim 3, wherein the grouping unit comprises an image turning unit turning the image of a page on which the foil object is to be formed at an arbitrary angle so that foil-stamping printing is performed at the set position of the foil roll which is set in the foil stamping device.

5. The information processing device according to claim 4, wherein the grouping unit comprises a page sorting determining unit determining whether the pages can be sorted or not for each of pages included in the job and sorting the pages which can be sorted.

6. The information processing device according to claim 5, further comprising a post-process notifying unit notifying a post-process device coupled to the foil stamping device and capable of sorting the sheets for each of the jobs or the pages of a result of sorting of the jobs, and making the post-process device execute sorting of the foil-stamped sheets into the original order.

7. The information processing device according to claim 6, wherein in the sorting policy, sorting of the jobs on the basis of the set position of the foil roll which is set in the foil stamping device is specified.

8. The information processing device according to claim 6, wherein in the sorting policy, sorting of the jobs on the basis of deadline information of the jobs is specified.

9. The information processing device according to claim 6, wherein in the sorting policy, sorting of the jobs on the basis of the number of printing sheets in the job is specified.

10. A non-transitory recording medium storing a computer-readable program:
calculating foil object information including position and size of a foil object in a direction orthogonal to a feeding direction of a sheet which is fed to a foil stamping device on the basis of foil-stamping print data extracted from print data included in a plurality of jobs;
grouping the jobs on the basis of a foil roll which can be attached to the foil stamping device and the foil object information;
sorting the grouped jobs on the basis of a preliminarily specified sorting policy by group;

transmitting, to the foil stamping device, the foil-stamping print data including the foil object which is extracted from the print data and is for stamping foil to the sheet on which an image is formed;

transmitting no-foil print data which is extracted from the print data and does not include the foil object to an image forming device for forming the image on the sheet; and outputting foil roll replacement information indicating a timing that the foil roll is replaced.

11. The non-transitory recording medium storing the computer-readable program according to claim 10, further outputting the roll replacement information to a first information presenting unit presenting the foil roll replacement information or transmitting the roll replacement information to the foil stamping device, and making a second information presenting unit of the foil stamping device present the foil roll replacement information.

12. The non-transitory recording medium storing the computer-readable program according to claim 11, further merging the job which is included in the group and in which the number of sheets is equal to or less than designated number of sheets to another group to which foil-stamping printing is performed by using a foil roll having a foil roll width larger than that of the foil roll used for the foil-stamping printing of the job.

13. The non-transitory recording medium storing the computer-readable program according to claim 12, wherein the grouping of the jobs comprises turning of the image of a page on which the foil object is formed at an arbitrary angle so that foil-stamping printing is performed at the set position of the foil roll which is set in the foil stamping device.

14. The non-transitory recording medium storing the computer-readable program according to claim 13, wherein the grouping of the jobs comprises determining whether the pages can be sorted or not for each of pages included in the job and sorting the pages which can be sorted.

15. The non-transitory recording medium storing the computer-readable program according to claim 14, further notifying a post-process device coupled to the foil stamping device and capable of sorting the sheets for each of the jobs or the pages of a result of sorting of the jobs, and making the post-process device execute sorting of the foil-stamped sheets into the original order.

16. The non-transitory recording medium storing the computer-readable program according to claim 15, wherein in the sorting policy, sorting of the jobs on the basis of the set position of the foil roll which is set in the foil stamping device is specified.

17. The non-transitory recording medium storing the computer-readable program according to claim 15, wherein in the sorting policy, sorting of the jobs on the basis of deadline information of the jobs is specified.

18. The non-transitory recording medium storing the computer-readable program according to claim 15, wherein in the sorting policy, sorting of the jobs on the basis of the number of printing sheets in the job is specified.

19. A printing system comprising:
an image forming device forming an image on a sheet;
a foil stamping device stamping foil on the sheet on which the image is formed; and
an information processing device,
wherein the information processing device comprises:
a foil object information calculating unit calculating foil object information including position and size of a foil object in a direction orthogonal to a feeding direction of a sheet which is fed to the foil stamping device on the basis of foil-stamping print data extracted from print data included in a plurality of jobs;
a grouping unit grouping the jobs on the basis of a foil roll which can be attached to the foil stamping device and the foil object information;
a job sorting unit sorting the grouped jobs on the basis of a preliminarily specified sorting policy by group;
a foil-stamping print data transmitting unit transmitting, to the foil stamping device, the foil-stamping print data including the foil object which is extracted from the print data and is for stamping foil to the sheet on which an image is formed;
a no-foil print data transmitting unit transmitting no-foil print data which is extracted from the print data and does not include the foil object to the image forming device; and
a foil roll replacement information output unit outputting foil roll replacement information indicating a timing that the foil roll is replaced.

20. The printing system according to claim 19, further comprising a first information presenting unit presenting the foil roll replacement information,
wherein the foil roll replacement information output unit outputs the roll replacement information to the first information presenting unit or transmits the roll replacement information to the foil stamping device, and makes a second information presenting unit of the foil stamping device present the foil roll replacement information.

21. The printing system according to claim 20, further comprising a merging unit merging the job which is included in the group and in which the number of sheets is equal to or less than designated number of sheets to another group to which foil-stamping printing is performed by using a foil roll having a foil roll width larger than that of the foil roll used for the foil-stamping printing of the job.

22. The printing system according to claim 21, wherein the grouping unit comprises an image turning unit turning the image of a page on which the foil object is to be formed at an arbitrary angle so that foil-stamping printing is performed at the set position of the foil roll which is set in the foil stamping device.

23. The printing system according to claim 22, wherein the grouping unit comprises a page sorting determining unit determining whether the pages can be sorted or not for each of pages included in the job and sorting the pages which can be sorted.

24. The printing system according to claim 23, further comprising a post-process notifying unit notifying a post-process device coupled to the foil stamping device and capable of sorting the sheets for each of the jobs or the pages of a result of sorting of the jobs, and making the post-process device execute sorting of the foil-stamped sheets into the original order.

25. The printing system according to claim 24, wherein in the sorting policy, sorting of the jobs on the basis of the set position of the foil roll which is set in the foil stamping device is specified.

26. The printing system according to claim 24, wherein in the sorting policy, sorting of the jobs on the basis of deadline information of the jobs is specified.

27. The printing system according to claim 24, wherein in the sorting policy, sorting of the jobs on the basis of the number of printing sheets in the job is specified.

* * * * *